United States Patent Office 3,350,174
Patented Oct. 31, 1967

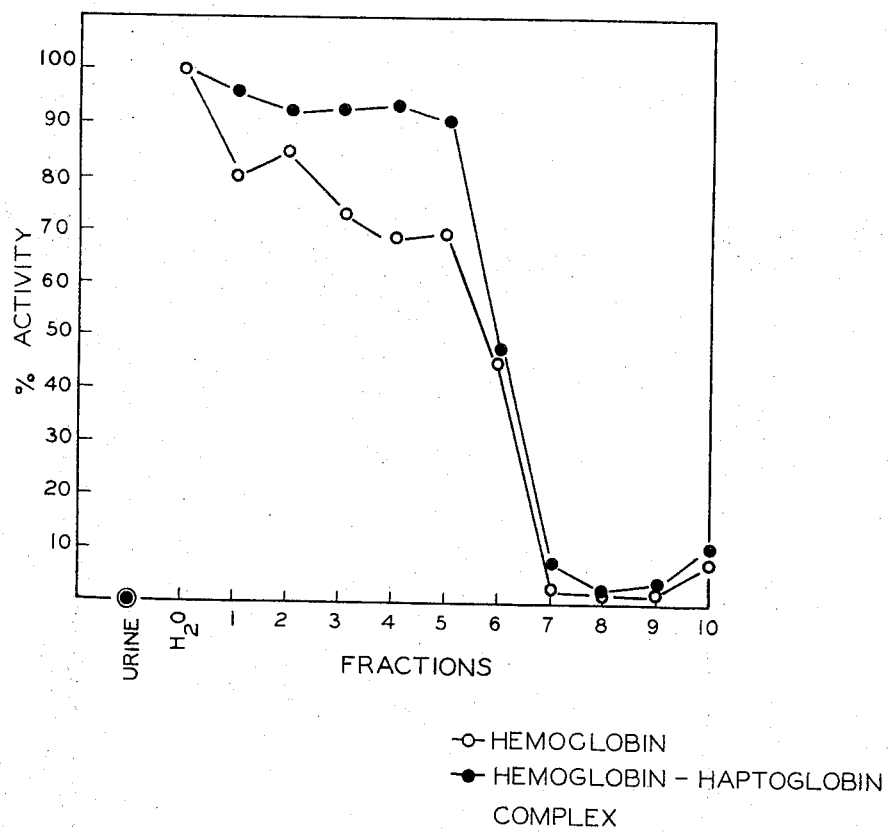

3,350,174
PROCESS OF DETERMINING HEMOGLOBIN SEPARATED FROM PEROXIDASE INHIBITORS IN URINE
Hermann Mattenheimer, Deerfield, Ill., assignor to Miles Laboratories, Inc., Elkhart, Ind., a corporation of Indiana
Filed Jan. 8, 1964, Ser. No. 336,570
13 Claims. (Cl. 23—230)

ABSTRACT OF THE DISCLOSURE

Hemoglobin is separated from peroxidase inhibitors in urine by treatment with serum haptoglobin to form a hemoglobin-haptoglobin complex which upon application to a gel column is excluded from the gel matrix and passes through the column.

---

This invention relates to the determination of hemoglobin in urine, and is particularly concerned with a process of separating hemoglobin from certain other dissolved or suspended components of urine which interfere with the quantitative determination of hemoglobin thereby improving the accuracy of such determinations.

As is well known the determination of hemoglobin in urine is an invaluable aid to the medical practitioner in the diagnosis of a number of physical disorders. In accordance with a conventional analytical procedure the amount of hemoglobin in a test specimen is determined in terms of its peroxidase-like activity as measured by its ability to catalyze the oxidation of an indicator such as o-tolidine which is colorless until it becomes oxidized and colored in its oxidized form. Thus, in such test, the presence of peroxidase-like activity is indicated by color formation, the density of the color increasing with increasing peroxidase-like activity, that is, with increasing hemoglobin concentration.

While the o-tolidine method just mentioned is a useful tool in detecting the presence of hemoglobin in urine its accuracy is open to question because of the presence in urine, frequently, of substances which inhibit the peroxidase-like activity of the hemoglobin, thereby giving an indication of less hemoglobin than is actually present in the specimen being tested. A further complication affecting the accuracy of the o-tolidine method is that these inhibitors to peroxidase-like activity (hereinafter referred to simply as peroxidase inhibitors) are not present in all urines to the same extent, so that a known and constant factor cannot be used for any given urine to compensate for the effect of its contained peroxidase inhibitors.

The peroxidase inhibitors are of various molecular weights, those accounting for the great preponderance of inhibition activity being of relatively low molecular weight. The remaining peroxidase inhibitors, which are of high molecular weight, are present in urine only in very small proportion and account for only a small amount of inhibition of the peroxidase-like activity of hemoglobin as determined by the o-tolidine method. The high molecular weight inhibitors are not dialyzable against water through a cellophane membrane, and are sometimes referred to hereinafter as "group 1" inhibitors; those of lower molecular weight are dialyzable, and will sometimes be referred to hereinafter as "group 2" inhibitors.

It is an object of the invention to provide a recovering hemoglobin from urine in a condition substantially uncontaminated with the lower molecular weight peroxidase inhibitors, whereby a suspension of the recovered hemoglobin may be tested for hemoglobin concentration with a high degree of accuracy, using the o-tolidine method or other methods based on measurement of the peroxidase-like activity of free hemoglobin.

Another object is to protect the hemoglobin during the procedure for its quantitative determination against its destruction, and against the reduction or loss of its peroxidase-like activity.

Other objects and advantages of the invention will in part be obvious and will in part appear in the following description, wherein a presently preferred mode of practicing the invention is set forth.

Generally speaking, the invention comprises mixing serum haptoglobin with the urine specimen in which the hemoglobin content is to be determined, whereby a hemoglobin-haptoglobin complex is formed, then subjecting the resulting specimen to gel filtration in a filter bed or column which permits low molecular weight components to diffuse into the gel matrix, while excluding the high molecular weight components. The hemoglobin-haptoglobin complex being a high molecular weight component, cannot diffuse into the gel matrix and therefore passes through the bed or column directly and completely.

The material preferred for use as the gel filtration agent isa polysaccharide dextran suitably cross-linked with epichlorohydrin to produce a hydrophilic solid gel characterized by a high degree of microporosity. Such gels are commercially available under the trade name "Sephadex" and are further identified in commerce by type-designations "G–25," "G–50" and "G–75" indicative of the character of their porosity and of their "water-regain" values which will be defined hereinafter. These materials are distributed by Pharmacia Fine Chemicals, Inc., New York, N.Y.

The methods of preparing these preferred gel materials, and of using them as molecular sieves in gel filtration, and a discussion of their characteristics and properties, are set forth in detail in the academic dissertation by Per Flodin entitled, "Dextran Gels and Their Applications in Gel Filtration," at Uppsala University, Sweden. The dissertation is listed in the 1962 volume of "Svenak Bokforteckning," page 76, and copies of the dissertation are available from Pharmacia Fine Chemicals, Inc., New York, N.Y., or the publisher Meijels Bokindustri, Halmstad, Sweden. Additional information on these gels and their uses is set forth in a brochure entitled, "Sephadex in Gel Filtration," available from Pharmacia Fine Chemicals, Inc., above-mentioned.

The utility of the materials used as gel filtration agents for separating solutes of given molecular size from solutes of smaller molecular size, is dependent upon the character of the pores in the gel network which determines the ability of solutes of various molecular sizes to diffuse through such network. The "Sephadex" gels are characterized by a three-dimensional network of polysaccharide chains, and the porosity of the network in the various types of "Sephadex" gels is determined by the different degrees of cross-linking therein, a high degree of cross linking giving a compact structure of low porosity with a low degree of cross-linking giving a highly porous structure.

Accordingly, for any given degree of porosity in a gel being used as a molecular sieve in gel filtration, solutes, whether ionized or non-ionized, of a molecular size smaller than the pores of the gel network can diffuse relatively freely through the network of the gel grains, whereas the diffusion of solutes of larger molecular size through the gel grains will be restricted by the limitations imposed by the porosity of the gel network, and solutes of even larger molecular size will be completely prevented from entering the gel particles.

From the foregoing it will be seen that by forming a complex of hemoglobin and haptoglobin in accordance with the present invention, and thereby producing a solute of larger molecular size than hemoglobin itself, a gel material having larger pores may be used as the filtration material than could be used for separating hemoglobin itself as a solute. By using such gel material having larger pores, the maximum molecular weight and size of the peroxidase inhibitors which will diffuse through the gel grains are increased, and thus a greater proportion of such peroxidase inhibitors may be removed from urine during the gel filtration, whereby the accuracy of the determination of hemoglobin by subsequent testing of the effluent fractions containing the hemoglobin-haptoglobin complex, for peroxidase activity, is greatly improved.

The addition of haptoglobin to a hemoglobin-containing urine serves other useful functions besides increasing the effective molecular size of hemoglobin to facilitate its separation from peroxidase inhibitors by gel filtration. For example, as will be shown hereinafter, when haptoglobin is combined with hemoglobin it effectively protects the peroxidase-like activity of the hemoglobin against the inhibiting action of the peroxidase inhibitors of high molecular weight (that is, the group 1 inhibitors) which accompany the hemoglobin-haptoglobin complex through the gel filter, so that a measurement of the peroxidase activity of the hemoglobin-haptoglobin complex provides a true indication of the amount of hemoglobin present in the urine specimen.

I have learned that a hemoglobin solution may lose a considerable percentage of its peroxidase activity, for example, up to 30 percent or more, during its passage through a gel filtration column. This loss in peroxidase activity, the cause of which is not fully understood, may also be avoided by adding haptoglobin to the hemoglobin-containing urine specimen to bring about the formation of the hemoglobin-haptoglobin complex before passing the specimen through the gel column. Thus, the addition of haptoglobin to a hemoglobin-containing urine sample being prepared for gel filtration is effective in this additional way to protect the property of hemoglobin upon which is based the most convenient method for its assay, namely, its peroxidase-like activity.

As disclosed in the above-mentioned Flodin dissertation, when using the hydrophilic dextran gel materials for effecting the separation from one another of solutes of widely varying molecular weights and molecular sizes, the gel material is first swelled with an excess of a suitable liquid, such as water or dilute saline solution, preferably with stirring. While the gel is being swelled, gel fines are preferably removed by stirring up the gel and then allowing it to settle; when a sharp boundary layer has formed the supernatant containing the fines is decanted off. This procedure is preferably repeated until the supernatant is clear. The swollen gel is then ready for use in preparing a filtration bed or column.

In preparing a gel bed for use in the present process I provide a cylindrical glass tube, such as a chromatographic tube, of desired dimensions and provided with a stop-cock at the bottom. The tube is mounted in a vertical position and at the bottom thereof, immediately above the stop-cock, I provide a thin layer of glass wool and, above the latter, a thin layer of glass beads of about 0.1 mm. diameter on which the gel bed will be directly supported. With the stop-cock closed, the tube is then substantially filled with water at room temperature. If the water is too cold air bubbles tend to form on the gel particles which are added later, disturbing the packing thereof. A funnel is then secured to the top of the tube by means of a single-hole stopper, and a suspension of the swollen gel particles in 0.1 percent saline solution, from which the fines have been substantially removed during or after the swelling procedure, as described above, is added to the funnel. The gel suspension in the flared upper part of the funnel is preferably stirred. The gel particles slowly settle through the funnel and cylindrical tube to the bottom of the latter. When a layer of gel particles of about 2 to 5 centimeters (cm.) has formed, the stop-cock is carefully opened to allow a slow flow of the dilute saline solution therethrough. If more gel suspension is to be added in order to prepare a thicker bed, the stop-cock is closed again, preferably before the liquid level drops below the lower end of the delivery tube of the funnel, so that when more gel suspension is added to the funnel it will not disturb the surface of the gel bed being formed.

For best results, the rising surface of the gel bed as it is being formed should be horizontal. Also, any additional gel suspension should be added before all of the gel previously present in the glass tube has become packed, to improve the uniformity of the packing. After such additional gel suspension has been added and allowed to settle substantially, as described above in connection with the initial introduction of the gel suspension, the stop-cock is again carefully opened to drain surplus dilute saline solution from the cylindrical tube. This procedure is repeated as often as necessary to provide a gel bed of desired thickness. After the gel bed has been thus formed, the dilute saline solution is drained just to the level of the gel bed and the bed is washed with any suitable eluant, such as 0.1 percent saline solution, until the bed has become mechanically stable. About three to five bed volumes of eluant are used for washing the bed, and the eluant is added carefully to the cylindrical tube (preferably maintaining a head of eluant of at least a few centimeters above the bed surface) in order to avoid disturbing the bed surface. Such eluant is also drained just to the level of the bed surface, and the latter is now further stabilized mechanically by placing thereon a well-fitted circular disk of filter paper. The gel column is then ready for use in gel filtration. A more detailed description of apparatus which may be used for preparing the gel column, and of a procedure for packing the column, are given in the above mentioned Flodin dissertation, and particularly at pages 43 to 45 thereof.

As will appear from the more detailed description of the process hereinafter, the liquid used for swelling the gel particles need not be of precisely the same composition as that used for eluting the column. For example, the liquid used for swelling the gel may be water, while the eluting liquid may be a dilute saline solution. Both the swelling and eluting liquids may be identical, as in the common situation in which a single gel column is used for successive gel filtrations, and after each such filtration step the bed is regenerated by passing eluant through the bed until the solutes of lower molecular weight, derived from the liquid specimen previously filtered, have been substantially removed from the pores of the gel network. Thus, the liquid used for swelling the gel, and the liquid used for eluting the column, may both be termed "eluant" for the purpose of defining the condition of a gel column when it is in readiness for use in gel filtration, and both such liquids have the same limitation insofar as their solute content is concerned, namely, any such contained solutes must be substantially of small molecular weight and size permitting them to diffuse freely throughout the network defining the pores of the gel structure.

In a bed or column of swollen gel particles prepared for filtration, the water content consists of two parts, that is, the internal water and the external water. The volume of the internal water is equal to the imbibed volume $V_i$ of the column, that is, the total water content of all of the gel particles in the column. Thus, when the density of water is taken as unity:

$$V_i = a.W_r$$

where $a$ is the weight in grams of the dry gel present in the column and $W_r$ is the "water regain," expressed as grams of water imbibed per gram of dry gel.

The volume of external water in a properly packed column in which water fills all spaces unoccupied by the gel matrix, is equal to the volume of the void space between the gel particles, and is known as the void volume. The water regain value of a gel may be determined by the following simple procedure described in the above mentioned Flodin dissertation. The gel is allowed to swell in water for twenty-four hours. About 10 ml. of the swollen gel is transferred to a weighed cylindrical container having a bottom fabricated of 400 mesh nylon net and carried in the open end of a centrifuge tube. The length of the container is about one-half the length of the centrifuge tube, thus placing the nylon net bottom thereof about midway of the length of the centrifuge tube and transversely thereof. The liquid outside the gel particles, that is, the liquid in the void space between the gel particles, is then centrifuged down through the nylon net at 1,000 to 2,000 revolutions per minute at a radius of 15 cm., for twenty minutes, the said container and its contents are then weighed, and the contents transferred to a beaker and dried to constant weight at 105° C., after which the dried gel is weighed. The water regain is given in terms of grams of water imbibed per gram of dry gel.

The void volume of the gel column or bed may be easily determined as follows. The gel bed is prepared, for example as described above, in a glass cylinder, with the eluting liquid completely filling the void space between the gel particles. A narrow zone or layer of a solution of a colored high molecular weight substance, for example, India ink, is carefully placed on top of the bed and as soon as the India ink has entered the bed, elution of the column with a suitable liquid, for example, distilled water or 0.1 percent saline solution, is commenced and maintained until the zone of India ink leaves the bottom of the bed. This procedure also affords a good opportunity to determine by visual examination the condition of the gel column. In a well packed column the eluted zone of India ink will remain narrow and symmetrical. The liquid volume leaving the bottom of the glass cylinder is measured from the moment the top of the zone of India ink enters the gel bed until such zone is seen to leave the bottom of the gel bed. The volume thus measured is the void volume of the bed; it is also designated the "elution volume" for a solute known to be completely excluded from the gel particles.

The water regain value of cross-linked dextran gels is an index of their porosity and of the dimensions of the openings in the network structure of the gel grains which define the pores. Thus, the water regain value of such gels provides an indication of the molecular weights and sizes of solutes which may diffuse freely through the gel grains, or which may diffuse through such grains in only a restricted way, or which may be completely excluded from the gel grains.

As mentioned above, an important step in the present process consists in adding serum haptoglobin to the urine specimen being tested for its content of free hemoglobin, whereby a hemoglobin-haptoglobin complex is formed, and then subjecting the resulting urine specimen to gel filtration to separate the hemoglobin-haptoglobin complex from peroxidase inhibitors of lower molecular weight present in the urine specimen. A gel suitable for use as the filtration agent is the polysaccharide dextran cross-linked with epichlorohydrin and having a water-regain value of about 5.0. In such a gel the porosity is characterized by dimensional limitations which preclude diffusion therein of the hemoglobin-haptoglobin complex while permitting diffusion into the gel network of the preponderance of the lower molecular weight peroxidase inhibitors, whereby in the filtering process the latter are retained temporarily in the bed while the hemoglobin-haptoglobin complex passes directly and completely through the bed with the eluting liquid. A commercially available dextran gel of this description is the above mentioned "Sephadex G–50" gel, which has been determined to have a porosity effective to completely exclude solutes having a molecular weight greater than about 10,000, while permitting solutes having molecular weights up to about 3000 to diffuse freely into the gel network.

Of course, dextran gels having water regain values somewhat lower and somewhat higher than 5.0 can also be used, if desired. For example, dextran gels having water regain values of about 2.5 to about 7.5 may also be considered within the preferred range. However, as the water regain values decrease the maximum molecular weight of the peroxidase inhibitors which may diffuse into the gel is correspondingly lowered, so that more of the lower molecular weight (group 2) peroxidase inhibitors may pass through the gel bed concurrently with the hemoglobin-haptoglobin complex to inhibit the peroxidase-like activity of the latter in the subsequent o-tolidine test. Also, if the water regain value is increased substantially, say to above about 7.5, some of the hemoglobin-haptoglobin complex may be imbibed by the gel.

The "Sephadex" dextran gels are commercially available in two physical forms, that is, as irregularly shaped particles resulting from disintegration of a solid mass or block of polymerized material, and as spherical particles or beads resulting from polymerization of the reactants in a dispersed state in an inert dispersion medium. Of these, the bead form is preferred for use in the present process since filtration beds prepared with the beads afford greatly improved flow rates, while retaining good separation resolution, when compared with beds prepared from the irregularly shaped particles of the same particle size.

These gels are also available commercially in several different grades defined in terms of particle size, that is, coarse (approximately 50 to 100 mesh), medium (approximately 100 to 250 mesh), and fine (smaller than 200 mesh), as defined by the United States Standard Screen Series. All such grades of dextran gels may be used in the present process, although the medium grade is preferred since it affords good efficiency of separation of the hemoglobin-haptoglobin complex from solutes of lower molecular weight while allowing a satisfactory flow rate of liquids through the bed.

Haptoglobin is a mucoprotein which in electrophoresis travels with the $\alpha_2$ globulins and has the ability to form an extremely tightly bonded complex with free hemoglobin. Serum haptoglobin (hereinafter referred to simply as haptoglobin) may be prepared by a method described by G. E. Connell and R. W. Shaw in their article, "The Purification of Haptoglobin," in Canad. J. Biochem. Pysiol, vol. 39, pages 1013 to 1019 (1960). Haptoglobin combines with free hemoglobin in a 1:1 molar ratio in forming the hemoglobin-haptoglobin complex. Preferably, only enough haptoglobin (plus a small excess) is used as is necessary to combine with the maximum amount of hemoglobin that is expected to be present in the urine being tested. In order to enable one practicing the invention to determine the amount of haptoglobin solution to add to a urine specimen, and to avoid wasting haptoglobin, the haptoglobin solution should be first standardized to determine the haptoglobin concentration. Such standardization may be accomplished by titrating the haptoglobin solution against a solution containing a known amount of hemoglobin as described by J. A. Owen, F. C. Better, and J. Hoban in J. Clin. Pathology, vol 13, page 163.

After the haptoglobin is added to the urine specimen, a short time is allowed, for example 5 to 10 minutes, to allow the hemoglobin-haptoglobin complex to form, and the urine specimen is then carefully placed on the surface of a bed or column of swollen gel prepared as previously described. After the urine specimen enters the gel column, the column is eluted with a suitable eluting liquid, for example, 1 percent saline, and the fraction or fractions of effluent from the column which contain the hemoglobin-haptoglobin complex are collected for determination of the amount of hemoglobin therein. The amount of hemoglobin in the effluent may be determined by the o-tolidine test with the aid of a calibration curve prepared from the results of o-tolidine tests on solutions of known different concentrations of hemoglobin-haptoglobin complex (and therefore of known hemoglobin concentration) but which were free of peroxidase inhibitors. Other suitable methods for determining the hemoglobin by measurement of its peroxidase-like activity by using other indicators, such as guaiacol, benzidine or reduced phenolphthalein, in accordance with well-known techniques, may also be used if desired.

In practicing the o-tolidine test for hemoglobin, the reagents which I used are 10 percent hydrogen peroxide and 0.05 percent o-tolidine dihydrochloride in 0.1 M tartrate buffer, the buffer being a mixture of 0.1 M sodium tartrate and 0.1 M tartaric acid, having a pH of 4.5.

The following examples illustrate the invention.

*Example 1*

(a) Commercial hemoglobin was added to a hemoglobin-free urine in the proportion of 48 micrograms ($\mu$g.) of hemoglobin per milliliter (ml.) of urine, to provide a test sample of known hemoglobin content. One ml. of this sample was mixed with 2 ml. of the above mentioned buffered o-tolidine reagent and 0.5 ml. of the 10 percent hydrogen peroxide. The color developed in the resulting solution was read continuously at 635 millimicrons (m$\mu$) in the Coleman spectrophotometer until the maximum optical density was reached, which required about five minutes. The results thus obtained, interpreted with the aid of a calibration curve prepared from data obtained by running the o-tolidine test on peroxidase inhibitor-free aqueous hemoglobin solutions of known different hemoglobin concentrations, indicated a concentration of hemoglobin in the urine specimen of only 10 percent of the amount known to be present in the specimen.

(b) A gel bed was prepared in the manner described above using completely swollen "Sephadex G-50" gel in bead form, of "medium" grade, the void space between the gel particles being completely filled with dilute saline solution. Swelling of the gel was effected by mixing the initially dry gel with an excess of 0.1 percent saline solution for a few hours, with intermittent decantation and removal of fines as previously described. The gel bed was contained in a glass cylinder, and a well-fitting circular disk of filter paper was used to stabilize the bed surface mechanically. The cylinder was provided with a discharge orifice at its lower end controlled by a stop-cock, and the bed had a height of about 200 millimeters (mm.) and a diameter of about 15 mm. The gel bed was supported by a layer of glass beads of about 0.1 mm. diameter, which in turn was supported by a shallow layer of glass wool disposed immediately above the stop-cock. Five ml. of the hemoglobin-containing urine described in part (a) of this example was carefully pipetted onto the top of the gel bed without disturbing the bed surface, and the stop-cock was then opened to allow the urine to enter the bed. When the top of the urine sample coincided with the top of the bed a few milliliters of 1.0 percent saline solution was carefully pipetted onto the top of the bed to start elution of the bed, and then additional 1.0 percent saline solution was added to the cylinder to continue elution of the bed. From the time elution started, the effluent from the discharge orifice was collected in collection tubes in fractions of 2 ml., and the said fractions were separately tested for hemoglobin by means of a commercially available hemoglobin-detecting unit. The composition and preparation of such hemoglobin-detecting unit is fully described in United States Patent No. 3,012,976 to Adams and Peterson. Other dry hemoglobin-detecting units suitable for this purpose are disclosed in United States Patent No. 3,092,463.

The effluent fractions which gave a positive reaction for hemoglobin with the hemoglobin-detecting unit were tested for hemoglobin by the o-tolidine test outlined in part (a) of this example. The results of such tests, interpreted with the aid of the calibration curve used in part (a) indicated the total hemoglobin content of such fractions to be only 38.4 percent of the amount of hemoglobin known to be present in the urine sample. In this gel filtration procedure, most of the hemoglobin appeared in fractions numbers 4 and 5.

(c) To 5 ml. of the hemoglobin-containing urine described in part (a) of this example was added, as a suspension, an amount of serum haptoglobin slightly in excess of the stoichiometric amount needed to form a complex with all the hemoglobin known to be present in the urine sample, the haptoglobin suspension having been standardized as described above. After allowing a short time, that is, about 5 to 10 minutes, for the hemoglobin-haptoglobin complex to form, the resulting urine sample was subjected to gel filtration, including elution, in the same manner and under the same conditions as those described for the urine sample tested in part (b) of this example, 2 ml. fractions of the effluent from the gel bed being collected and tested for the presence of hemoglobin with hemoglobin-detecting units. The fractions giving a positive reaction for hemoglobin were tested for peroxidase-like activity by the o-tolidine test outlined in part (a) of this example, and the results of such tests, interpreted with the aid of a calibration curve prepared from data obtained by running the o-tolidine test on peroxidase inhibitor-free aqueous solutions of hemoglobin-haptoglobin complex of known and varying concentration, indicated the total hemoglobin content of such fractions to be 99.5 percent of the amount of hemoglobin known to be present in the urine sample. All of such hemoglobin (present as the hemoglobin-haptoglobin complex) determined by the o-tolidine tests was present in fractions 2 to 5. The lower-molecular-weight peroxidase inhibitors appeared primarily in fractions 7 to 10. This was demonstrated by adding 20 $\mu$g. of commercial hemoglobin to each of the fractions 7 to 11 and then subjecting samples from each of such fractions to the o-tolidine test for hemoglobin according to the procedure set forth in part (a) of this example. These latter tests, interpreted with the aid of the calibration curve used in part (a) of this example, indicated a hemoglobin content in fraction number 7 of only 8 percent of the amount of hemoglobin known to be present; in fraction number 8 only 6 percent; in fraction number 9 only 7 percent; in fraction number 10 only 30 percent; and in fraction number 11 the full 100 percent (indicating that all peroxidase inhibitors were removed from the gel bed and the bed thus regenerated for re-use, by elution of the bed with about 20 ml. of saline solution).

In Example 1, above, part (a) demonstrates the large loss in peroxidase-like activity suffered by hemoglobin which is present in urine containing both group 1 and group 2 peroxidase inhibitors. Part (b) demonstrates that such loss in peroxidase-like activity may be reduced by passing the urine through a gel filter which separates the hemoglobin from a large proportion of the peroxidase inhibitors, and particularly from the group 2 inhibitors of lower molecular weight.

Part (c) illustrates a preferred procedure in accordance with the invention. By adding serum haptoglobin to the hemoglobin-containing urine sample to form the hemoglobin-haptoglobin complex, not only is the peroxidase-like activity of the hemoglobin protected during its passage through the gel column whereby the hemoglobin-haptoglobin complex is separated from the lower molecular weight peroxidase inhibitors of group 2, but the peroxidase-like activity of the hemoglobin is also protected against the inhibiting action of the large molecular weight inhibitors of group 1 which pass out of the gel column concurrently with the hemoglobin-haptoglobin complex, thus permitting an accurate assay to be made of the hemoglobin in the effluent by measuring its peroxidase-like activity. The ability of haptoglobin to protect hemoglobin against the inhibiting activity of the group 1 peroxidase inhibitors of large molecular weight is shown in the following example.

*Example 2*

Five ml. of a urine showing strong inhibition of peroxidase-like activity was passed through a column of "Sephadex G–50" gel prepared in accordance with Example 1 (b) and following the filtration procedure set forth in Example 1 (b). Ten 2 ml. fractions of effluent from the column were separately collected. Each of such fractions was divided in two to provide duplicate sets of 1 ml. portions of each fraction. A known quantity of hemoglobin was added to each of such 1 ml. portions in one of such sets, and a known quantity of hemoglobin followed by an equivalent amount of haptoglobin was added to each of the 1 ml. portions of the other set. The hemoglobin peroxidase-like activity of each of such 1 ml. portions was then measured, using the o-tolidine test procedure set forth in Example 1. The results of such tests are shown in the drawing included herewith. These tests showed the hemoglobin content in fractions 1 to 5 (which contained the high molecular weight peroxidase inhibitors of group 1), to which both the hemoglobin and haptoglobin had been added, to be over 90 percent of the amount of hemoglobin known to be present, and further indicated the hemoglobin content in the same fractions to which hemoglobin alone had been added to be between 68 and 85 percent of the amount of hemoglobin known to be present. In fractions 7 to 10, which contained the lower molecular weight peroxidase inhibitors of group 2, there was no significant difference between the amounts of hemoglogin indicated to be present in the portions to which both hemoglobin and haptoglobin were added and the amounts of hemoglobin indicated to be present in the corresponding portions to which hemoglobin alone had been added.

The size of the gel bed or column may be varied widely, depending on the separation problem involved. In general, the longer the gel column and the smaller its diameter, the better the separation obtained, although a practical limitation on column length may be imposed by the flow rate of the liquid therethrough which is reduced as the column length is increased for any given diameter. The height:diameter ratio is not critical, but ratios of 10:1 to 20:1 are preferred in practice.

Theoretically, in order to get complete separation of the hemoglobin-haptoglobin complex from the peroxidase inhibitors of lower molecular weight the volume of the urine sample passed through the gel bed should not exceed the imbibed volume of the gel particles comprising the bed. As a practical matter, however, the sample volume should not exceed four-tenths of such imbibed volume.

When the hemoglobin-haptoglobin complex is completely excluded from the gel particles, as in the case of a bed prepared from "Sephadex G–50" gel, substantially all of the hemoglobin-haptoglobin complex in a urine sample will appear during elution in a volume, equal to the void volume as defined above, which leaves the discharge opening of the cylinder containing the bed after a volume of liquid equal to the void volume plus the "dead volume" under the bed (the dead volume being the space between the bottom of the bed and the lower discharge opening not occupied by the glass beads and wool supporting the bed) has flowed out of the discharge opening immediately following placement of the urine sample onto the gel bed. More specifically, substantially all of the hemoglobin-haptoglobin complex in a urine sample will under ideal conditions be found in a volume equal to the sample volume collected after an effluent volume equal to the void volume plus the said dead volume has passed through the lower discharge opening immediately following placement of the urine sample on the surface of the gel bed. However, since various factors, such as an imperfect packing of the bed, affect the integrity and symmetry of the zone of the urine sample as its passes through the bed, it is preferable, as a practicable matter, to collect the effluent in successive small fractions and to test each fraction for the presence of hemoglobin (in the form of the complex with haptoglobin) by a suitable test device as described and then to determine by a suitable procedure, such as the o-tolidine test, the amount of hemoglobin present in the fractions which gave a positive test for hemoglobin with the test device.

The size of such fractions of effluent is not critical, although it will be apparent that the smaller the volume of the fractions (especially at the end of the period during which the hemoglobin-haptoglobin complex leaves the column in the effluent), the smaller is the concentration of lower molecular weight peroxidase inhibitors in the final fraction containing hemoglobin-haptoglobin complex likely to be. Generally speaking, the volume of such effluent fractions collected during the time in which the hemoglobin-haptoglobin complex appears in the effluent should be smaller than the volume of the urine sample being treated in the column, good results being obtained when the volume of each of such fractions is about 40 percent of the volume of the urine sample, as shown in part (c) of the Example 1. Obviously, also, the effluent need not be collected in such small fractions during the period when the entire volume of eluant initially present in the gel bed is leaving the bed, or after the zone of urine has passed completely through the bed. Bearing this in mind, it will be understood that collection of the effluent in the said small separate fractions should commence before a volume equal to the void volume minus the volume of the urine sample has left the bottom of the gel bed, when measurement of such first mentioned volume is made from the moment the urine specimen has completely entered the gel bed. Collection of the effluent as small fractions may of course be discontinued when a test on the effluent with a hemoglobin test unit does not show the presence therein of the hemoglobin-haptoglobin complex.

It will be seen from the foregoing specification that I have provided a novel method of separating hemoglobin from the preponderance of the peroxdase inhibitors present in urine, whereby a test for peroxidase-like activity on the recovered hemoglobin, as a complex with haptoglobin, provides an accurate indication of the amount of hemoglobin initially present in the urine.

Although gels prepared by cross-linking dextran with epichlorohydrin, and having a water regain value of about 5.0, are preferred for use in my process, it will be understood that other insoluble, hydrophilic, microporous solids having the desirably porous characteristics discussed above, that is, substantially uniform pores of a size to preclude diffusion into the gel network of solutes having a molecular weight greater than about 10,000 but large enough to permit free diffusion into the gel network of solutes of substantially smaller molecular weight, for example, under about 3,000 may also be used in the process.

It will also be understood that the foregoing description is merely illustrative of the invention, and that various changes in the techniques, conditions, proportions, compositions, gel characteristics and other factors set forth may be made without departing from the spirit of the invention as defined in the appended claims.

What is claimed:

1. In a method of separating hemoglobin from peroxidase inhibitors in urine containing the same, the steps comprising adding to a specimen of said urine a quantity of serum haptoglobin at least equivalent stoichiometrically to the maximum amount of hemoglobin to be separated, whereby a complex is formed between said hemoglobin and said haptoglobin, introducing the resulting urine specimen onto a bed of finely divided particles of insoluble, hydrophilic, cross-linked polysaccharide gel having a water-regain value of about from 2.5 to 7.5, the gel particles of said bed being entirely swollen with an aqueous eluant and the spaces between said particles being filled with said eluant, said bed having a height:diameter ratio of at least about 10:1, the volume of said urine specimen being not more than about the imbibed volume of said gel particles, after said urine specimen has entered said bed and while the level of said urine specimen is substantially coincident with the top of said bed commencing elution of the latter by passing an aqueous eluting liquid therethrough and continuing said elution until the quantity of said eluting liquid used for elution exceeds the void volume of said bed, and collecting as separate quantities a plurality of fractions of effluent from the bottom of said bed, said collecting step continuing until said hemoglobin-haptoglobin complex is substantially absent from said effluent.

2. The method in accordance with claim 1, wherein said gel consists of dextran of an average molecular weight of about 40,000 cross-linked with epichlorohydrin.

3. The method in accordance with claim 1, wherein the water-regain value is about 5.0.

4. The method in accordance with claim 1, wherein the volume of each of said fractions is about 40% of the volume of said urine specimen.

5. A method of separating hemoglobin from peroxidase inhibitors in urine containing the same, comprising adding to a specimen of said urine a quantity of serum haptoglobin at least equivalent stoichiometrically to the maximum amount of hemoglobin to be separated, whereby a complex is formed between said hemoglobin and said haptoglobin, introducing the resulting urine specimen onto a bed of finely divided particles of gel consisting essentially of insoluble, hydrophilic, dextran cross-linked with epichlorohydrin and having a water-regain value of about from 2.5 to 7.5, the gel particles of said bed being entirely swollen with an aqueous eluant and the spaces between said particles being filled with said eluant, said bed having a height:diameter ratio of at least about 10:1, the volume of said urine specimen being not more than about the imbibed volume of said gel particles, after said urine specimen has entered said bed and while the level of said urine specimen is substantially coincident with the top of said bed commencing elution of the latter by passing an aqueous eluting liquid therethrough, continuing said elution until the quantity of said eluting liquid used for elution exceeds the void volume of said bed, collecting as separate quantities a plurality of fractions of effluent from the bottom of said bed, the volume of each of said fractions being smaller than the volume of said urine specimen, and testing said fractions for the presence therein of said hemoglobin-haptoglobin complex.

6. The method in accordance with claim 5, wherein the water-regain value is about 5.0.

7. In a method of determining the amount of hemoglobin in urine which also contains inhibitors to the peroxidase-like activity normally exhibited by hemoglobin, the steps comprising adding to a specimen of said urine a quantity of serum haptoglobin at least equivalent stoichiometrically to the maximum amount of hemoglobin to be determined, whereby a complex is formed between said hemoglobin and said haptoglobin, introducing the resulting urine specimen onto a bed of finely divided particles of insoluble, hydrophilic, cross-linked dextran gel having a water-regain value of about from 2.5 to 7.5, the gel particles of said bed being entirely swollen with an aqueous eluant and the spaces between said particles being filled with said eluant, said bed having a height:diameter ratio of at least 10:1, the volume of said urine specimen being not more than about the imbibed volume of said gel particles, after said urine specimen has entered said bed and while the level of said urine specimen is substantially coincident with the top of said bed commencing elution of the latter by passing an aqueous eluting liquid therethrough, continuing said elution until the quantity of said eluting liquid used for elution exceeds the void volume of said bed, collecting as separate quantities a plurality of fractions of effluent from the bottom of said bed, the volume of each of said fractions being less than the volume of said urine specimen, testing said fractions for the presence therein of said hemoglobin-haptoglobin complex, and determining the amount of said complex in said fractions containing said complex by measuring the peroxidase-like activity of said complex in said fractions.

8. The method in accordance with claim 7 wherein the water-regain value is about 5.0.

9. In a method of separating hemoglobin from peroxidase inhibitors in urine containing the same, the steps comprising adding to a specimen of said urine a quantity of serum haptoglobin at least equivalent stoichiometrically to the maximum amount of hemoglobin to be separated, whereby a complex is formed between said hemoglobin and said haptoglobin, introducing the resulting urine specimen onto a bed of finely divided particles of an insoluble, hydrophilic, microporous solid filter agent, the pores of said agent being of a size to preclude diffusion into the network thereof of solutes having a molecular weight greater than about 10,000 but to permit such diffusion of solutes of substantially smaller molecular weights, said bed having a height:diameter ratio of at least 10:1, the volume of said urine specimen being not more than about the imbibed volume of said gel particles, immediately after said urine specimen has entered said bed eluting the latter with a quantity of eluting liquid which exceeds the void volume of said bed, and collecting as separate quantities a plurality of fractions of effluent from the bottom of said bed, said collecting step continuing until said hemoglobin-haptoglobin complex is substantially absent from said effluent, the volume of each of said fractions being smaller than the volume of said urine specimen.

10. In a method of separating hemoglobin from peroxidase inhibitors in urine containing the same, the steps comprising adding to a specimen of said urine a quantity of serum haptoglobin at least equivalent stoichiometrically to the maximum amount of hemoglobin desired to be separated, whereby a complex is formed between said hemoglobin and said haptoglobin, subjecting the resulting urine specimen to gel filtration in a bed of finely divided particles of gel consisting essentially of insoluble, hydrophilic dextran cross-linked with epichlorohydrin and having a water-regain value of about from 2.5 to 7.5, the gel particles of said bed being entirely swollen with an aqueous eluant and the spaces between said particles being filled with said eluant, said bed having a height:diameter ratio of at least about 10:1, the volume of said urine specimen being not more than about the imbibed volume of said gel particles, eluting said bed, following entry therein of said urine specimen, by passing an aqueous eluting liquid through said bed until the quantity of said eluting liquid used for elution exceeds the void volume of said bed, and collecting as separate quantities a plurality of fractions of effluent from the bottom of said bed, said collecting step continuing until said hemoglobin-haptoglobin complex is substantially absent from said effluent, the volume of each of said fractions being smaller than the volume of said urine specimen.

11. The method in accordance with claim 10, wherein the water-regain value is about 5.0.

12. A method of separating hemoglobin from peroxidase inhibitors in urine containing the same which comprises adding serum haptoglobin to a specimen of said urine, whereby a hemoglobin-haptoglobin complex is formed, and then subjecting the resulting urine specimen to gel filtration, whereby the hemoglobin-haptoglobin complex is separated from said peroxidase inhibitors.

13. A method of separating hemoglobin from peroxiase inhibitors in urine containing the same which comprises adding to a specimen of said urine a quantity of haptoglobin at least equivalent stoichiometrically to the maximum amount of hemoglobin to be separated, whereby a complex is formed between said hemoglobin and said haptoglobin, introducing the resulting urine specimen onto a bed of finely divided particles of an insoluble, hydrophilic, microporous solid, said solid having a porosity effective to completely exclude substances having a molecular weight greater than about 10,000 while permitting substances having molecular weights of up to about 3000 to diffuse freely through the pores thereof, and eluting from said bed said hemoglobin-haptoglobin complex uncontaminated by said peroxidase inhibitors.

References Cited

FOREIGN PATENTS 865,265  4/1961  Great Britain.

OTHER REFERENCES

Dobryszycka et al.: "Isolation of Serum Haptoglobin in the Form of Hemoglobin Complex," Chem. Abstracts, p. 5583, vol. 59, September 1963.

JOSEPH SCOVRONEK, *Acting Primary Examiner.*

MORRIS O. WOLK, *Examiner.*

L. MEI, *Assistant Examiner.*